2 Sheets—Sheet 1.

E. B. REQUA.

Lamp.

No. 1,488.

Reissued June 2, 1863.

Witnesses:

J. W. Coombs

A. B. Hayes

Inventor:

E. B. Requa

R. PETERS, Photo-Lithographer, Washington, D. C.

2 Sheets—Sheet 2.

E. B. REQUA.

Lamp.

No. 1,488.

Reissued June 2, 1863.

*Witnesses:*

J. W. Coombs

A. P. Cayes

*Inventor:*

E. B. Requa

N. PETERS, Photo-Lithographer, Washington, D. C.

UNITED STATES PATENT OFFICE.

E. B. REQUA, OF JERSEY CITY, NEW JERSEY.

IMPROVEMENT IN LAMPS.

Specification forming part of Letters Patent No. 35,175, dated May 6, 1862; Reissue No. 1,188, dated June 2, 1863.

*To all whom it may concern:*

Be it known that I, E. B. REQUA, of Jersey City, in the county of Hudson and State of New Jersey, have invented a new and Improved Lamp; and I do hereby declare that the following is a full, clear, and exact description of the same, reference being had to the accompanying drawings, making a part of this specification, in which—

Figure 1:
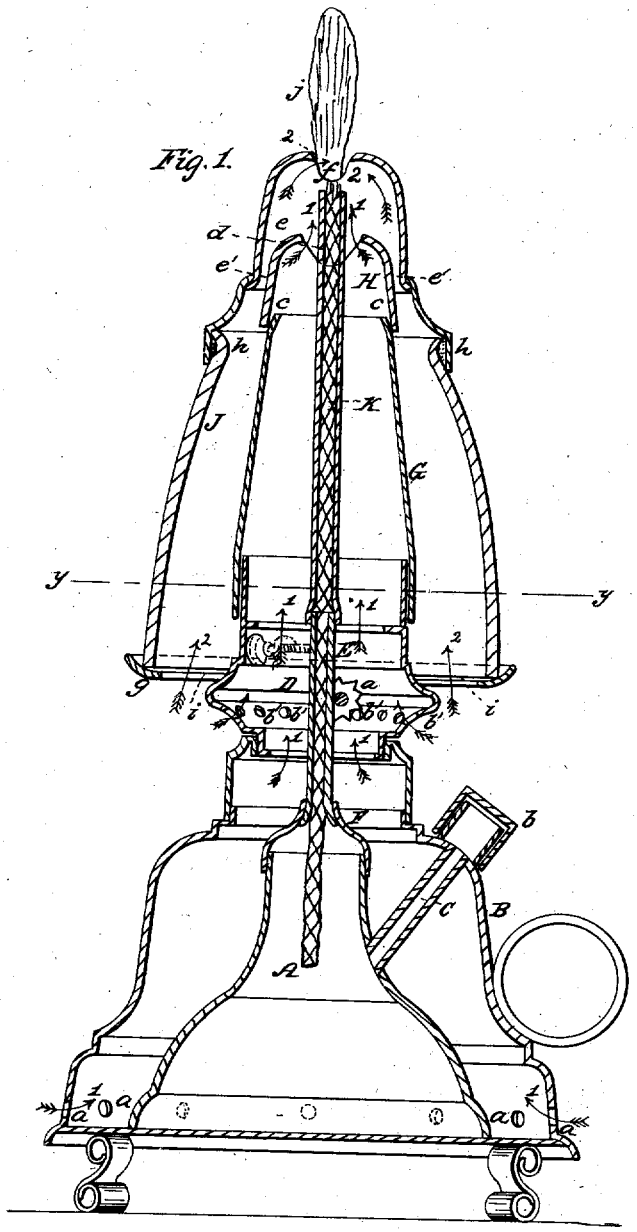
Figure 2:
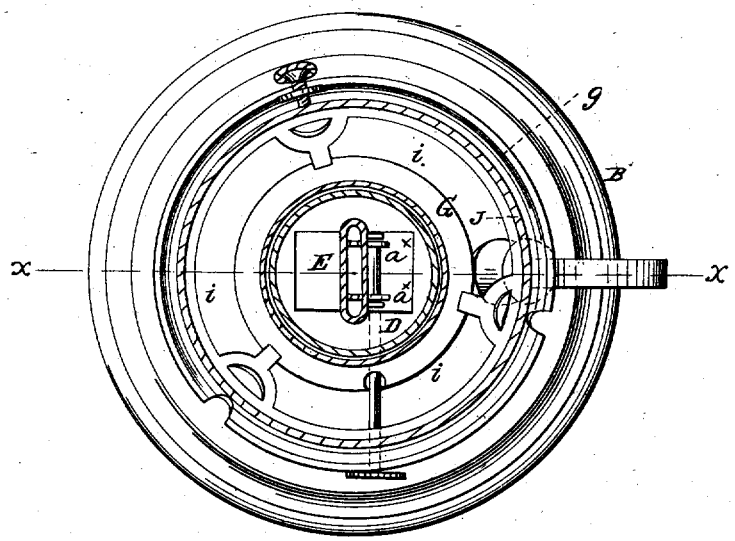

Figure 1 is a vertical central section of my invention, taken in the line *x x*, Fig. 2; Fig. 2, a horizontal section of the same, taken in the line *y y*, Fig. 1.

Similar letters of reference indicate corresponding parts in the two figures.

This invention relates to an improved lamp of that class designed for burning coal-oils without a chimney; and it consists in constructing the burner of the lamp in such a manner that the flame will be supplied with a requisite amount of oxygen to insure perfect combustion, and at the same time be capable of being adapted or applied to any of the lamps in general use without heating and vaporizing the oil in the lamp to cause an explosion thereof, and without obstructing the rays of light or casting a shade around the lamp.

To enable those skilled in the art to fully understand and construct my invention, I will proceed to describe it.

A represents the body or fountain of the lamp, which is inclosed by a jacket or case, B, of any suitable or desired form, having perforations *a* all around it at its lower part. The fountain A may be supplied with oil through a tube, C, which projects through the jacket or case B, and is provided with a stopper, *b*.

D represents the burner, which is screwed into the upper end of the jacket or case B, and is provided with a wick-tube, E, of the usual flat form. The lower end of the wick-tube E is provided with a bell-shaped cap, F, which, when the burner is screwed into the top of the jacket or case B, serves as a top for the fountain A, as shown in Fig. 1. The burner D, just above the jacket or case B, is perforated with holes *b'*, which extend all around it.

G is a vertical tube, which may be of slightly conical form, and is fitted on the burner D so as to inclose the greater part of the wick-tube E. On the top of this tube G a cone or deflector, H, is fitted or secured and insulated by means of plaster-of-paris, *c*, or any cement or material which is a good non-conductor of heat. The cone or deflector H may be of the same form as those used in ordinary coal-oil burners; but the upper end of the wick tube E, instead of being below the slot *d* of the cone, as usual, projects a little above it, as shown in Fig. 1.

I represents an outer cone or deflector, which encompasses concentrically the cone or deflector H, and is sufficiently larger in diameter to admit of a space or chamber, *e*, between them to serve as a draft-passage. The upper end or apex of the cone or deflector I is provided with a slot, *f*, which is in line with the slot *d* of cone H, and the top of the wick-tube E, and some distance above the latter. The cone I is of such a form and has such a position relatively with the cone H, as to leave a narrow space, *e'*, all around cone H, at about its center. (See Fig. 1.) Below this narrow space *e'* the cone I quickly expands, and is connected at its lower end to a glass tube, J, of conical or an approximate form, which rests on a horizontal annular flange, *g*, attached to the burner just above the perforations *a* thereof. The cone I may be insulated from the tube J by plaster-of-paris, *h*, interposed between them, or any other cement which is a good non-conductor of heat. The annular flange *g* has spaces *i* between it and the burner D, and the upper part of the space *e*, above the narrow part *e'*, and cone H, is comparatively large, so as to form quite a chamber at the base of the flame *j*.

The operation is as follows: The wick-tube E is supplied with a wick, K, of the usual flat kind, and when the wick is lighted the flame *j* is supplied with air through the jacket or case B, the air passing up through the lower part of the burner and into the bottom of tube G, and thence upward to the base of the flame *j*, as indicated by arrows 1. Another draft of air passes through the spaces or openings *i* in the flange *g*, and up through the tube J and into the space *e*, and impinges against the sides of the flame *j*, as indicated by the arrows 2. The narrow space *e'* causes quite a rapid current of air to impinge against the sides of the flame a short distance above the top of the wick-tube, and insures perfect combustion. Without this narrow space the current of air in space *e* would be sluggish and insufficient to produce a very beneficial result, for it will be seen that the air in J cannot be greatly rarefied, as the tube G covers the greater portion of the wick-tube E, and there is a current of air passing through G, which has a tendency to keep the wick-tube cool. On account of this arrangement the wick-tube cannot conduct heat down into the fountain A, so as to vaporize the oil therein, and as both the tubes G and J are insulated from their cones H I, they are also prevented from conducting heat down to the burner and fountain A, and the air passing up through the jacket or case B also has a tendency to keep the fountain and its contents in a cool state.

The burner D may be screwed into any ordinary lamp in the same way as it is screwed into the jacket or case B, herein described.

The wick K may be raised and lowered by the usual serrated wheel, $a^{\times}$ $a^{\times}$.

I do not claim, broadly, the employment or use of two tubes, G J, placed one within the other to supply the flame with air, nor do I claim an air passage encompassing the fountain of the lamp; but,

Having thus described my invention, what I do claim as new, and desire to secure by Letters Patent, is—

1. The tube G, made of metal, with its metal deflector H insulated by plaster-of-paris or other good non-conducting cement, or made of glass with the deflector H fitted upon it without cement.

2. The tube J, made of glass, with its deflector I of metal insulated by plaster-of-paris or other good non-conducting cement.

3. The combination of the two tubes G J, one placed within the other, and the inner one inclosing the wick-tube E, when said tubes are constructed with deflectors so as to admit of a space, *e*, between them, having a narrow passage, *e'*, to increase the rapidity of the draft against the sides of the flame, substantially as and for the purpose herein set forth.

4. Providing the lower end of the wick-tube E with a cap, F, to serve as a top for the fountain A, when said cap is used in connection with the tube G, applied to the burner D, the latter screwed into the jacket or case B, and all arranged as shown to form a simple device to admit of the flame being supplied with a requisite quantity of air at its base, and by a current which passes around the fountain A, to keep its contents cool, as herein described.

5. The combination of the two tubes G and J, cones H I, wick-tube E, cap F, burner D, flange *g*, jacket or case B, and fountain A—in short, the whole lamp—all arranged and constructed as and for the purpose and in the manner represented and described.

E. B. REQUA.

Witnesses:
J. P. FITCH,
GEO. H. DURYEE.